G. ROZENDAL.
PLANT PROTECTOR.
APPLICATION FILED MAY 28, 1909.
935,691.
Patented Oct. 5, 1909.
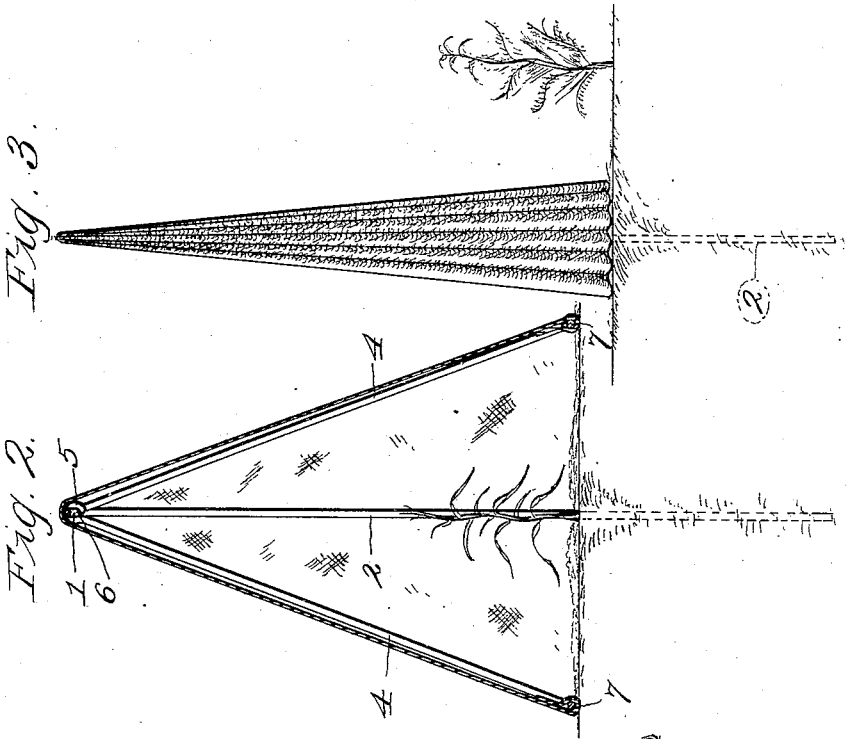
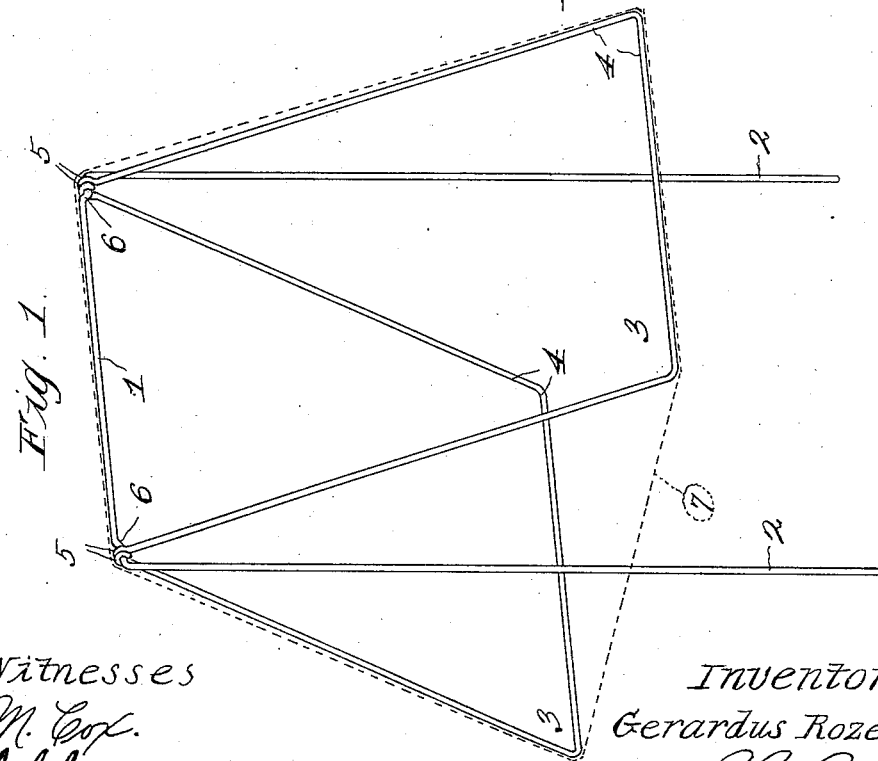
Witnesses
M. Cox.
J. C. Craven
Inventor:
Gerardus Rozendal,
By F. G. Fischer
Atty

UNITED STATES PATENT OFFICE.

GERARDUS ROZENDAL, OF LEAVENWORTH, KANSAS.

PLANT-PROTECTOR.

935,691.  Specification of Letters Patent.  Patented Oct. 5, 1909.

Application filed May 28, 1909.  Serial No. 498,792.

*To all whom it may concern:*

Be it known that I, GERARDUS ROZENDAL, a citizen of the United States, residing at Leavenworth, in the county of Leavenworth and State of Kansas, have invented certain new and useful Improvements in Plant-Protectors, of which the following is a specification.

My invention relates to improvements in plant protectors, and my object is to provide a device for advancing the growth of young plants and protecting the same from wind, hail, frost, insects, etc.

The device is collapsible so that it may be folded for storage, or transportation, or to act as a wind guard in protecting plants, and in order that the invention may be fully understood, reference will now be made to the accompanying drawing, in which:

Figure 1 shows a perspective view of the device extended, and in an operative position with the covering thereof indicated by dotted lines. Fig. 2 is a vertical transverse section of the device in an extended position. Fig. 3 is an end view of the device folded and occupying an operative position.

In carrying out the invention I employ a combination ridge and supporting member comprising a horizontal ridge member 1, and a pair of upright supporting-members 2 formed integral with the ridge member.

3 designates a pair of wings comprising U-shaped sections 4, hinged at their upper terminals 5 to the ridge member 1, which latter is bent downward near its ends to form shoulders 6, which, in conjunction with the upright supporting members 2, prevent the hinged ends of sections 4 from shifting laterally upon the ridge member. The wings are inclosed with a flexible covering of muslin or like fabric 7 whereby the plants beneath the same are protected. The supporting members 2 extend some distance below the wings so that they may be inserted in the ground as shown in Figs. 2 and 3 to reliably hold the device in position over a plant.

The wings may be extended to cover the plants, or folded against each other for storage or transportation, or when the device is to be used merely as a wind shield, as shown in Fig. 3, in which instance the device is reliably held in position by the supporting members 2, which are forced into the ground a sufficient depth to resist the force of the wind. The latter is a very important feature of the device because in warm weather it is desirable to leave the plants uncovered and yet protect them from strong winds, which I have found are very unfavorable to the growth of young plants, especially after transplanting the same, which renders them more susceptible to the detrimental influence of unfavorable weather than when grown from seeds planted in the open.

Having thus described my invention, what I claim is:—

1. A device of the character described, consisting of a pair of supporting members adapted to be inserted in the ground, a ridge member carried by said supporting members, a pair of wings hinged to the ridge member and adapted to be either extended in opposite directions or folded against each other, and a covering for the device.

2. A device of the character described, consisting of a pair of U-shaped wing sections, a combination ridge and supporting member carrying said wing sections, and a covering for the wing sections and said combination ridge and supporting member.

In testimony whereof I affix my signature, in the presence of two witnesses.

GERARDUS ROZENDAL.

Witnesses:
  FRED STODDARD,
  J. V. KELLY.